Patented Dec. 5, 1944

2,364,394

UNITED STATES PATENT OFFICE 2,364,394

PLASTICIZED RUBBER COMPOSITIONS AND METHOD OF PLASTICIZING RUBBER

Robert L. Sibley, Nitro, W. Va., assignor to Monsanto Chemical Company, St. Louis, Mo., a corporation of Delaware No Drawing. Application February 6, 1942,
Serial No. 429,794

10 Claims. (Cl. 260—761)

This invention relates to a method of increasing the plasticity of a rubber and to the new compositions obtained thereby.

It is common practice in the manufacture of rubber articles to add to the rubber during processing a material which decreases the resistance of the rubber to flow thereby facilitating the incorporation of compounding and vulcanizing ingredients and providing a composition amenable to shaping into final form. These additives take the form of lubricants such as pine oil or so called catalytic softeners as for example aromatic mercaptans or conventional plasticizers like dibutyl phthalate which are extensively used with certain synthetic rubbers and permanently alter and modify the properties of the original rubber. While many of the softeners or plasticizers of this invention exhibit a catalytic softening action and perhaps some lubricating action, they are further characterized by the fact that they can be used as conventional plasticizers in amounts which permanently modify and alter the rubber.

In accordance with this invention it has been discovered that the products obtained by treating a rubber with an aryl phosphine halide and a condensed aromatic polynuclear hydrocarbon are valuable agents for increasing the plasticity of a rubber. A preferred aspect of the invention contemplates the use of a soft sticky product obtained by treating a natural rubber with an aryl phosphine halide and retene. The term "a rubber" is used in the present specification and attached claims to mean a vulcanizable plastic material which possesses appreciable extensibility under load coupled with the property of forcibly retracting to approximately its original size and shape after the load is removed.

The preparation of the products obtained by treating a rubber with an aryl phosphine halide and a condensed aromatic polynuclear hydrocarbon is disclosed in co-pending application of George D. Martin, Serial No. 416,588, filed October 25, 1941, and in co-pending application of David J. Beaver, Serial No. 417,577, filed November 1, 1941. The methods of preparation are fully described and comprise, in general, bringing a rubber, in the presence of anhydrous aluminum chloride, into intimate association with the condensed aromatic polynuclear hydrocarbon and an aryl phosphine halide as for example tolyl dichlor phosphine, 1,3,4 trimethyl phenyl dichlor phosphine, xylyl dichlor phosphine, biphenyl dichlor phosphine, alpha naphthyl dichlor phosphine, tetrahydronaphthyl dichlor phosphine, dichlor phosphine of meta diphenyl benzene, chlor phenyl dichlor phosphine, cymyl dichlor phosphine and retyl dichlor phosphine. Many of the products described in the aforementioned applications are tough plastic materials and where it is desired to produce soft tacky products having enhanced catalytic softening effects the arylphosphine halide can be first treated with the condensed aromatic polynuclear hydrocarbon followed by the addition of the rubber.

While the preparation of the new softening or plasticizing agents is illustrated by typical examples given below, the present invention is not concerned with the preparation of the new adjuvants and is not limited thereto.

Example I

Substantially 100 parts by weight of crude tolyl dichlor phosphine (the lower layer obtained by reacting toluene with PCl₃ in the presence of anhydrous aluminum chloride as described in Liebig's Annalen, vol. 212, pp. 206, 207, and drawing off the lower layer which separated upon cooling) was added to a carbon disulfide cement containing substantially 100 parts by weight of guayule. The charge was stirred and heated at refluxing temperature for about an hour, 100 parts by weight of technical retene added and the stirring and heating continued for twelve hours after which a Liebig type condenser was substituted for the reflux condenser and the solvent removed by distillation. Heating was continued for a short time after distillation had substantially ceased and then live steam was introduced and after a thorough steaming out, the product was washed with water and dried to constant weight. A soft sticky rubbery product was obtained.

The physical nature of the product makes it somewhat difficult to handle and weigh but where desired it can be blended with an inert diluent to render it less tacky. Carbon black, paraffin, pine tar or starch are suitable for this purpose.

Example II

Substantially 100 parts by weight of crude tolyl dichlor phosphine was added to a carbon disulfide cement containing substantially 100 parts by weight of pale crepe rubber. The mixture was heated to refluxing temperature for about 90 minutes and a mixture of oleyl chloride and retene added. The latter was obtained by mixing 100 parts by weight of oleyl chloride with 100 parts by weight of technical retene in the presence of 4 parts by weight of anhydrous aluminum chloride. After the initial vigorous reaction had subsided somewhat as evidenced by an abatement of the HCl evolved, the mixture was added to the rubber cement and the heating continued for twelve hours. The solvent was then removed and the residue washed and dried to constant weight. A soft sticky product was obtained.

*Example III*

Substantially 100 parts by weight of technical retene was dissolved in 200 parts by weight of carbon disulfide and substantially 100 parts by weight of crude tolyl dichlor phosphine added to the solution so prepared. The charge was heated under reflux for about an hour after which a carbon disulfide cement containing 100 parts by weight of crepe rubber was added and the heating continued for twelve hours. The solvent was then removed, the residue washed with water and dried to constant weight. The product, although rubbery, was soft and tacky.

*Example IV*

Substantially 100 parts by weight of crude tolyl dichlor phosphine was added to a carbon disulfide cement containing substantially 100 parts by weight of pale crepe rubber. The charge was heated at refluxing temperature for about 90 minutes, substantially 100 parts by weight of technical retene added and the heating continued for 24 hours. The solvent was then removed by distillation, the residue treated with steam and washed with water. Since the portion of the product soluble in acetone exerts a strong plasticizing or softening action on rubber, it is preferred to concentrate this active ingredient by extracting the residue remaining after the washing operation, with acetone. Upon subsequent removal of the acetone a waxy solid was obtained.

*Example V*

Substantially 100 parts by weight of Thiokol type F (an alkylene dihalide sodium polysulfide polymer) was dispersed in ethylene dichloride and 100 parts by weight of crude tolyl dichlor phosphine added to the dispersion so prepared. The charge was heated to refluxing temperature for about an hour, substantially 100 parts by weight of technical retene added and the heating continued for eighteen hours. The solvent was then removed by distillation, the residue treated with steam, washed and dried. A soft oily product having a strong plasticizing effect in rubber was obtained.

*Example VI*

Chlorine was passed into technical retene until 18 percent by weight of chlorine had been absorbed. 118 parts by weight of this chlorinated retene and 50 parts by weight of crude tolyl dichlor phosphine were added to a benzene cement containing 100 parts by weight of pale crepe rubber. The charge was heated at 70–80° C. for five hours, the solvent removed by distillation and the residue treated with steam, washed with water and dried. A soft tacky product was obtained.

The following specific embodiments of the invention illustrate the desirable properties of the new softening or plasticizing agents and are not to be taken as limitative of the invention.

A quantity of a rubber-carbon black master batch composed of sixty parts smoked sheets of rubber and forty parts of carbon black was milled for a short time to assure uniformity and then smoked sheets of rubber, compounding and vulcanizing ingredients (except sulfur) were added in such amount as to produce rubber stocks of the composition shown below. In order to assure reproducible results the same temperature and time of milling was employed in the preparation of each stock. Thus the milling time was nine minutes and the mill rolls were maintained at a temperature of 100° C. In this manner, a rubber base stock was compounded comprising

| | Base stock, parts by weight |
|---|---|
| Smoked sheets rubber | 100. |
| Carbon black | 50. |
| Zinc oxide | 5. |
| Laurex | 2. |
| Condensation product p-amino diphenyl and acetone | 1.5 |
| Mercaptobenzothiazole | 0.75 |

From the base stock so prepared rubber stocks were compounded comprising

| Stock | Ingredient added to base stock | Parts by weight |
|---|---|---|
| A | Product of Example I | 1.0 |
| AA | Product of Example I | 1.5 |
| B | Product of Example II | 1.0 |
| BB | Product of Example II | 1.5 |
| C | Product of Example III | 1.0 |
| CC | Product of Example III | 1.5 |
| D | Product of Example IV | 1.0 |
| E | Product of Example V | 1.0 |
| F | Product of Example VI | 1.0 |

At the end of the milling period the stocks so compounded were sheeted out and allowed to stand until they had cooled to room temperature. The sheets were then folded back upon themselves to build up a thickness sufficient to cut test pellets and test pellets cut out by means of a suitable die. The plasticity or resistance of the pellets to flow was measured by means of an extrusion plastometer. A description of the method and apparatus is given by J. H. Dillon in Rubber Chemistry and Technology, volume 9 (1936), pages 496–501. The quantity measured was the time in seconds required to extrude a given volume of rubber at constant temperature and under a constant pressure. In the particular tests herein described the pellets were preheated 18 minutes at 149° C. and then inserted into the plastometer, the latter being maintained as near to 82° C. as possible. With ordinary care the temperature can be kept within the range of 82 to 85° C. The pressure on the plunger was 5.5 pounds per square inch. The figures given in the table below are ratios based upon the control or base stock as 100 when run under exactly the same conditions. In other words, the percentage plasticity based on the untreated stock was calculated from the actual readings in seconds. Thus, a figure 70 means that a given volume of the stock extruded in 70 percent of the time required to extrude the same volume of stock in the absence of the preferred materials.

| Stock | Plasticity figure |
|---|---|
| A | 68.1 |
| AA | 56.5 |
| B | 72.9 |
| BB | 64.5 |
| C | 67.5 |
| CC | 64.1 |
| D | 63.3 |
| E | [1] 68.4 |
| F | [2] 82.7 |

[1] Test pellet preheated 24 minutes at 90° C., and extruded under 4.5 pounds/in.² air pressure.
[2] Test pellet preheated 15 minutes at 82° C.

The foregoing data show that the preferred class of materials exert a powerful catalytic softening action when incorporated into rubber.

Frequently the amount of the softening agent can be increased with advantageous effects. For example, the preferred materials are useful binding agents and extenders, as well as softeners, for rubbers which are exceptionally difficult to break down and knit on a rubber mill. While unvulcanized scrap alone is difficult to form into a smooth sheet, in combination with the preferred materials useful compositions can be readily and easily obtained without resort to a reclaiming process. For example, vulcanizable compositions were easily and quickly compounded from ingredients comprising

|  | Stock | |
| --- | --- | --- |
|  | G | H |
|  | Parts by weight | Parts by weight |
| Ground truck peels | 100 | 100 |
| Product of Example I | 10 |  |
| Non-tacky, rubber-like product obtained by treating ground truck peels with tolyl dichlor phosphine and technical retene |  | 20 |
| Zinc oxide | 5 | 7 |
| Mercaptobenzothiazole | 1 | 1.2 |
| Sulfur | 2 | 3 |
| Stearic acid | 0.5 |  |

Homogeneous compositions were formed which gave smooth sheets when cut from the mill rolls. The stocks so compounded were vulcanized in a press in the usual manner by heating for different periods of time at the temperature of 30 pounds steam pressure per square inch. The modulus and tensile properties of the cured products were as follows:

*Table I*

| Stock | Cure time in mins. | Modulus of elasticity in lbs./in.² at elongation of 200% | Tensile at break in lbs./in.² | Ult. elong., per cent |
| --- | --- | --- | --- | --- |
| H | 20 | 1,255 | 2,135 | 295 |
| G | 30 | 1,175 | 2,250 | 335 |
| H | 30 | 1,450 | 1,530 | 210 |
| G | 45 | 1,255 | 2,150 | 300 |

The results show that the preferred materials are softeners and plasticizing binders for vulcanized scrap rubber. With synthetic rubber materials like Hycar OR and Perbunan (co-polymers of butadiene and acrylic nitrile) the softening action of the preferred materials is especially pronounced in that the time of milling is considerably reduced over that normally required. The plastic compositions comprising an admixture of a butadiene compound polymer type synthetic rubber and a rubber like oil resistant plastic obtained by treating a rubber with an aryl phosphine halide are claimed in co-pending application of Paul M. Downey, Serial No. 426,069, filed January 8, 1942.

While the specific embodiments furnished to illustrate the invention disclose the addition of the plasticizing agent to the rubber on an ordinary rubber mill, other types of apparatus may be used as for example, a Banbury type mixer or a Gordon plasticator.

Again, the invention is not limited to the specific embodiments of the invention. The preferred materials may be employed in different proportions than specifically shown and in conjunction with other compounding and vulcanizing ingredients. Obviously, many variations can be made without departing from the spirit of the present invention. This invention is limited solely by the claims attached hereto as part of the present specification.

What is claimed is:

1. A composition comprising predominately a rubber and as a softener and plasticizer thereof a heat reaction product of a rubber and substantial proportions based on the rubber of an aryl phosphine halide having the halogen linked to the phosphorus and an aromatic condensed polynuclear compound.

2. A composition comprising predominately a natural rubber and as a softener and plasticizer thereof a heat reaction product of a rubber and substantial proportions based on the rubber of an aryl dichlor phosphine having the two chlorine atoms linked to the phosphorus and an aromatic condensed polynuclear hydrocarbon.

3. A composition comprising predominately vulcanized scrap rubber and as a softener, binder and plasticizer thereof a heat reaction product of a rubber and substantial proportions based on the rubber of an aryl dichlor phosphine having the two chlorine atoms linked to the phosphorus and an aromatic condensed polynuclear hydrocarbon.

4. A composition comprising predominately a vulcanized ground scrap rubber and as a softener, binder and plasticizer thereof a soft sticky heat reaction product of a natural rubber and substantial proportions based on the rubber of tolyl dichlor phosphine having the two chlorine atoms linked to the phosphorus atom and retene.

5. Unvulcanized india rubber of decreased resistance to flow containing as the softening ingredient a small amount of a soft tacky heat reaction product of a rubber and substantial proportions based on the rubber of an aryl dichlor phosphine having the two chlorine atoms linked to phosphorus and a condensed polynuclear aromatic hydrocarbon.

6. Unvulcanized india rubber of decreased resistance to flow containing as the softening ingredient a small amount of a soft sticky heat reaction product of a natural rubber and substantial proportions based on the rubber of an aryl dichlor phosphine having the two chlorine atoms linked to phosphorus and a condensed polynuclear aromatic hydrocarbon.

7. Unvulcanized india rubber of decreased resistance to flow containing as the softening ingredient a small amount of a soft tacky heat reaction product of guayule rubber and substantial proportions based on the rubber of tolyl dichlor phosphine having the two chlorine atoms linked to phosphorus and retene.

8. The method of increasing the plasticity of unvulcanized rubber which comprises subjecting unvulcanized india rubber under non-vulcanizing conditions to the action of a small amount of a soft tacky heat reaction product of a rubber and substantial proportions based on the rubber of an aryl dichlor phosphine having the two chlorine atoms linked to phosphorus and a condensed polynuclear aromatic hydrocarbon for a time and temperature sufficient to decrease the resistance of the rubber to flow over that which it would have in the absence of said soft tacky heat reaction product.

9. The method of increasing the plasticity of unvulcanized rubber which comprises subjecting unvulcanized india rubber under non-vulcanizing conditions to the action of a small amount of a soft sticky heat reaction product of a natural rubber and substantial proportions based on the rubber of an aryl dichlor phosphine having the two chlorine atoms linked to phosphorus and a condensed polynuclear aromatic hydrocarbon for a time and temperature sufficient to decrease the resistance of the rubber to flow over that which it would have in the absence of said soft sticky heat reaction product.

10. The method of increasing the plasticity of unvulcanized rubber which comprises subjecting unvulcanized india rubber under non-vulcanizing conditions to the action of a small amount of a soft tacky heat reaction product of guayule rubber and substantial proportions based on the rubber of tolyl dichlor phosphine having the two chlorine atoms linked to phosphorus and retene for a time and temperature sufficient to decrease the resistance of the rubber to flow over that which it would have in the absence of said soft tacky heat reaction product.

ROBERT L. SIBLEY.